US011252126B1

(12) United States Patent
Thunga et al.

(10) Patent No.: US 11,252,126 B1
(45) Date of Patent: Feb. 15, 2022

(54) DOMAIN NAME RESOLUTION IN ENVIRONMENT WITH INTERCONNECTED VIRTUAL PRIVATE CLOUDS

(71) Applicant: Amazon Technologies, Inc., Seattle, WA (US)

(72) Inventors: Kiran Thunga, Chantilly, VA (US); Bing Xia, Fairfax, VA (US); Yohanes Santoso, Sterling, VA (US); Matthew Engskow, Arlington, VA (US); Quan Jia, Oakton, VA (US)

(73) Assignee: Amazon Technologies, Inc., Seattle, WA (US)

( * ) Notice: Subject to any disclaimer, the term of this patent is extended or adjusted under 35 U.S.C. 154(b) by 121 days.

(21) Appl. No.: 16/367,798

(22) Filed: Mar. 28, 2019

(51) Int. Cl.
| | |
|---|---|
| *H04L 29/12* | (2006.01) |
| *H04L 12/66* | (2006.01) |
| *H04L 12/46* | (2006.01) |
| *H04L 12/715* | (2013.01) |
| *H04L 61/106* | (2022.01) |
| *H04L 61/4511* | (2022.01) |
| *H04L 45/00* | (2022.01) |

(52) U.S. Cl.
CPC ........ *H04L 61/106* (2013.01); *H04L 12/4641* (2013.01); *H04L 12/66* (2013.01); *H04L 45/04* (2013.01); *H04L 61/1511* (2013.01)

(58) Field of Classification Search
CPC ... H04L 61/106; H04L 12/4641; H04L 12/66; H04L 45/04; H04L 61/1511
USPC ........................................................ 709/245
See application file for complete search history.

(56) References Cited

U.S. PATENT DOCUMENTS

| | | | | |
|---|---|---|---|---|
| 7,447,901 | B1* | 11/2008 | Sullenberger | ....... H04L 63/0272 713/153 |
| 8,612,565 | B2* | 12/2013 | Schneider | .............. G06Q 30/02 709/223 |
| 8,660,129 | B1* | 2/2014 | Brendel | .................. H04L 67/10 370/397 |
| 9,524,167 | B1* | 12/2016 | Cohn | ..................... G06F 9/3863 |
| 9,794,234 | B2* | 10/2017 | Pillai | ................... H04L 63/0435 |
| 9,806,991 | B2* | 10/2017 | Lucas | ................... H04L 45/302 |
| 9,979,588 | B1* | 5/2018 | Benson | ............. H04L 29/12066 |
| 10,015,094 | B1 | 7/2018 | Akers et al. | |
| 10,027,559 | B1 | 7/2018 | Kerl et al. | |
| 10,033,691 | B1* | 7/2018 | Mizik | ................... H04L 49/354 |
| 10,148,500 | B2* | 12/2018 | Marino | ................... H04L 45/74 |
| 10,243,919 | B1 | 3/2019 | Suresh et al. | |

(Continued)

OTHER PUBLICATIONS

U.S. Appl. No. 16/194,229, Publication Date Not published, Thunga et al.

(Continued)

*Primary Examiner* — David P Zarka
(74) *Attorney, Agent, or Firm* — Knobbe, Martens, Olson & Bear, LLP

(57) ABSTRACT

Systems and methods are provided for domain name system (DNS) resolutions in a network environment that includes multiple virtual private clouds (VPCs) attached indirectly to each other via a transit gateway that serves as a hub in a hub and spoke model. An administrator of a VPC may specify rules for resolving DNS resolution requests at the given VPC, and the rules may be taken into account by DNS resolvers at other VPCs attached to the same transit gateway based on information propagated by the transit gateway.

19 Claims, 6 Drawing Sheets

(56) References Cited

U.S. PATENT DOCUMENTS

| | | | | |
|---|---|---|---|---|
| 10,447,498 B2* | 10/2019 | De Luca | ............... | H04L 47/125 |
| 10,581,797 B2* | 3/2020 | Ripke | ................. | H04L 61/1511 |
| 10,616,179 B1* | 4/2020 | McCarriar | .......... | H04L 61/2514 |
| 10,708,226 B2* | 7/2020 | Cathrow | ................. | H04L 67/10 |
| 10,805,198 B2* | 10/2020 | Dixon | ................. | H04L 61/2007 |
| 10,862,852 B1* | 12/2020 | Thunga | ............... | H04L 63/0272 |
| 2018/0041468 A1* | 2/2018 | Miller | ................... | H04L 63/108 |
| 2018/0316612 A1 | 11/2018 | Akers et al. | | |
| 2018/0351904 A1* | 12/2018 | Mizik | ................. | G06F 9/45558 |

OTHER PUBLICATIONS

"Transit Network VPC (Cisco CSR)" AWS Implementation Guide, Amazon Web Services, Dec. 2017, available at https://docs.aws.amazon.com/solutions/latest/cisco-based-transit-vpc/welcome.html.

"Using DNS with Your VPC", Amazon Web Services, as archived Jan. 13, 2019, available at https://web.archive.org/web/20190113085453/https:/docs.aws.amazon.com/vpc/latest/userguide/vpc-dns.html.

Barr, J., "AWS Solution—Transit VPC", Amazon Web Services, Inc., Aug. 11, 2016, available at https://aws.amazon.com/blogs/aws/aws-solution-transit-vpc/.

\* cited by examiner

DOMAIN NAME RESOLUTION IN ENVIRONMENT WITH INTERCONNECTED VIRTUAL PRIVATE CLOUDS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete or otherwise manage virtual machines in a dynamic matter. In turn, users can request computer resources from a data center, including single computing devices or a configuration of networked computing devices, and be provided with varying numbers of virtual machine resources.

Generally, physical networks include a number of hardware devices that receive packets from a source network component and forward the packets to designated recipient network components. In physical networks, packet routing hardware devices are typically referred to as routers, which are implemented on stand-alone computing devices connected to a physical network. With the advent of virtualization technologies, networks and routing for those networks can now be simulated using commodity computing devices rather than actual routers.

Virtualized networks provide advantages over traditional networks, in that the can be rapidly created, configured, or destroyed without reconfiguring underlying physical hardware devices. However, they can also add a layer of complexity over traditional systems. For example, virtualized systems may not have direct physical addresses, as traditional systems would, making transmission of communications between virtualized systems more difficult. Moreover, at least some virtualized systems may be configured to be private, such that public network addressing schemes, which otherwise serve to enable communications between virtualized systems, are not directly usable to communicate between virtualized systems. Furthermore, private domain names and/or other domain name resolution rules may be established within an individual private virtualized system that may not be visible to other virtualized systems associated with the same owner or entity. Thus, there may be challenges that are unique to virtualized systems both in communicating between such virtualized systems and resolving domain name requests involving such virtualized systems.

BRIEF DESCRIPTION OF DRAWINGS

Embodiments of various inventive features will now be described with reference to the following drawings. The drawings are provided to illustrate example embodiments described herein and are not intended to limit the scope of the disclosure.

DETAILED DESCRIPTION

Figure 1A:
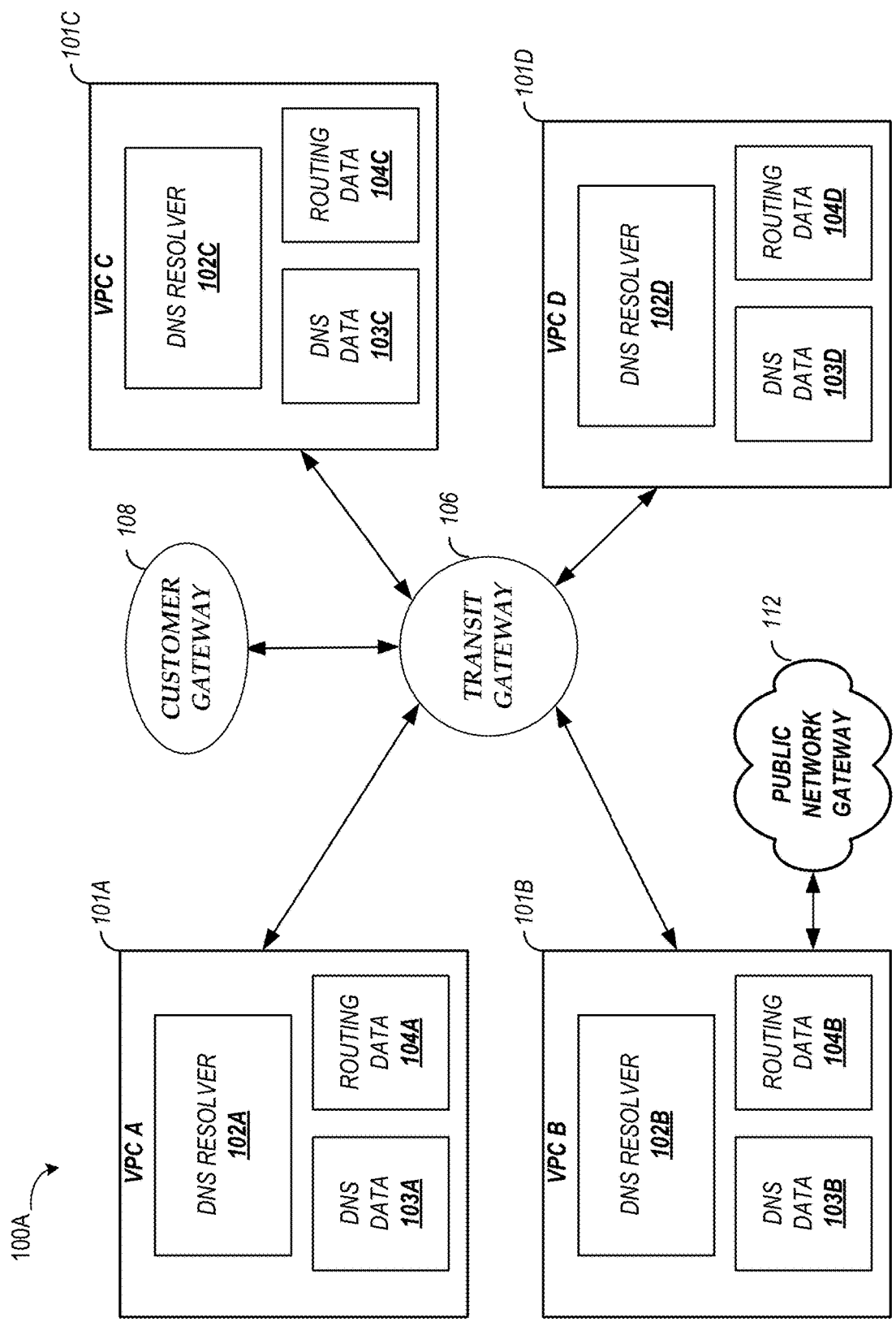
FIG. 1A is a block diagram illustrating multiple virtual private clouds (VPCs) attached to a transit gateway in a hub and spoke arrangement.

Generally described, the present disclosure relates to managing domain name system (DNS) requests in a network environment that includes multiple virtual private clouds (VPCs) attached indirectly to each other via a transit gateway that serves as a hub in a hub and spoke arrangement. An administrator of a VPC may specify rules for resolving DNS resolution requests at the given VPC, and the rules may be taken into account by DNS resolvers at other VPCs attached to the same transit gateway based on information propagated by the transit gateway during an attachment process. As will be discussed herein, information associated with a number of individual VPCs (potentially hundreds, in some instances) may be propagated to other VPCs that are attached to the same transit gateway or virtual hub, enabling various DNS resolution features at the individual VPCs. The propagated information associated with a given VPC may include one or more network address ranges, such as a Classless Inter-Domain Routing ("CIDR") address block, assigned to the VPC. The addresses configured within a given VPC may in some situations be virtual or private network addresses that are not directly addressable from a public network, and which may only be addressable by other VPCs that are either directly or indirectly peered with or attached to the given VPC. The propagated CIDR block information associated with the individual VPCs arranged in a hub and spoke manner as described herein may be used in resolving DNS requests at individual VPCs, as will be described below.

As used herein, the term "virtual private cloud network environment" (often shortened herein to "virtual private cloud" or simply "VPC") refers to a virtualized network environment, in which a collection of computing devices are enabled by a substrate network to communicate as if the collection of computing devices existed within a local area network (LAN) environment. Accordingly, the devices within a VPC may often share a common subnet, and (from the perspective of the devices) directly communicate with one another without the use of complex routing protocols. However, unlike traditional LANs, the devices within a VPC need not share a direct physical interconnection. Instead, the devices may be located in geographically diverse regions, and in some instances may themselves be virtual devices (e.g., virtual machines). A substrate (e.g., physical) network as will be described below, may encapsulate or otherwise alter communications from devices associated with the VPC to create the illusion, from the point of view of devices within the VPC, that a LAN environment exists.

VPCs can provide many advantages over traditional LANs, in that the configuration of computing devices can be changed dynamically, via software, without changing a physical configuration of devices. Moreover, VPCs maintain many benefits of traditional LANs, in that communications between the computing devices are relatively simple and secure. In part because a VPC or other virtual network environment can be set up without the need to dedicate entire hardware resources specifically to a given VPC, some VPC owners or administrators choose to establish hundreds or even thousands of individual VPCs for various purposes of a company or organization. As a default at the time a new VPC is created by such an owner or administrator, it may not have connectivity to any other VPCs associated with the owner or administrator. According to existing systems, the owner of a VPC may individually associate that VPC with another VPC in a one-to-one manner, which may be considered a VPC peering process, in order to enable communications between those two VPCs. In this manner, a VPC owner may, for example, set up edge connectivity to a public network at a first peered VPC, and configure the second peered VPC to access the public network via the first VPC. While this peering approach is sufficient in some instances, it is not an efficient approach to establishing relationships between many different VPCs (e.g., dozens, hundreds, or even thousands, any of which may be desired by a given administrator depending on the circumstances).

Embodiments of the present disclosure address these and other issues by enabling setup of a hub and spoke network topology that includes attaching a potentially large number of VPCs to a virtual hub (such hub is often referred to herein as a transit gateway) in a manner that allows DNS resolution at individual VPCs according to the domain resolution rules established at other VPCs in the arrangement.

The following section discusses various embodiments of managed networks for network data transmission, both with respect to the arrangement of cloud environments at the virtualization layer and the underlying substrate network. Following that is further discussion of systems and methods enabling attachment of VPCs to a transit gateway and the effects of such attachment on subsequent DNS resolution.

Managed Computer Networks for Network Data Transmission Analysis

With the advent of virtualization technologies, networks and routing for those networks can now be simulated using commodity hardware components. For example, virtualization technologies can be adapted to allow a single physical computing machine to be shared among multiple virtual networks or VPCs by hosting one or more virtual machines on the single physical computing machine. Each such virtual machine can be a software simulation acting as a distinct logical computing system that provides users with the illusion that they are the sole operators and administrators of a given hardware computing resource. In addition, as routing can be accomplished through software, additional routing flexibility can be provided to the virtual network in comparison with traditional routing. Despite the illusion of independence, such devices or clients accessing such devices may depend on a specific directory of addresses to ensure proper routing of network traffic within the virtual network and within other networks (e.g., other virtual networks or a public network such as the Internet).

Aspects of the present disclosure will be described with regard to illustrative logical networking functionality for managed computer networks, such as for virtual computer networks that are provided on behalf of users or other entities. In at least some embodiments, the techniques enable a user to configure or specify a network topology, routing costs, routing paths and/or other information for a virtual or overlay computer network including logical networking devices that are each associated with a specified group of multiple physical computing nodes. For example, a user (e.g., a network administrator for an organization) or service provider may configure a virtual or overlay network based on detected events, processing criteria, or upon request. With the network configuration specified for a virtual computer network, the functionality and operation of the virtual network can be simulated on physical computing nodes operating virtualization technologies. In some embodiments, multiple users or entities (e.g. businesses or other organizations) can access the system as tenants of the system, each having their own virtual network in the system. In one embodiment, even though physical components of a network may be shared, a user of a virtual network may not see another user's network traffic on another virtual network if monitoring traffic on the virtual network.

Hub and Spoke Arrangement of VPCs

FIG. 1A is a network diagram that includes four virtual private clouds 101A-101D (VPCs A through D) interconnected indirectly to one another via each of their attachments to the same virtual hub, illustrated as transit gateway 106. In the illustrated example, a system administrator of a given customer that created VPCs 101A-101D may have desired to interconnect each of the VPCs 101A-101D to one another in order to enable communication between them. The administrator may have further desired to have access to each of these VPCs from a distinct network maintained outside of the VPC environment (such as an on-premises network), and thus associated a customer gateway 108 with the transit gateway to enable communication between the customer's network and the VPCs attached to the transit gateway 106. Communication utilizing the customer gateway may be made via a virtual private network (VPN). The administrator may have further selected to have each of VPCs 101A-101D (VPCs A through D) access the Internet or other public network via VPC 101B (VPC B), and thus added a public network gateway 112 to VPC 101B. The public network gateway 112 may be or include a network address translation (NAT) gateway that enables instances in one or more private subnets to connect to the Internet or other services, but prevents the Internet or other outside network from initiating a connection with those instances.

The transit gateway 106 may not represent any particular hardware or system, but rather may be a network-accessible service or set of functionality provided by an operator of the VPCs 101A-101D. For example, an application programming interface (API), a command line interface, a graphical user interface (GUI) and/or other interfaces may be provided that enables administrators of individual VPCs to create a transit gateway, attach specific VPCs to that created transit gateway, and configure various aspects of the transit gateway's operation. Information stored in association with the transit gateway 106 may include routing data and optionally DNS data (not illustrated in FIG. 1A) associated with the various attached VPCs and associated gateways, as will be further discussed below. While a single transit gateway is illustrated, a given VPC may be attached to multiple transit gateways, in some embodiments. In some embodiments, a transit gateway may include an attachment to another transit gateway, which enables sharing or propagating of routing data and DNS data between VPCs that are connected to either transit gateway. For example, if a first five VPCs are attached to a first transit gateway and another ten VPCs are attached to a second transit gateway, establishing an attachment between the first transit and the second transit gateway may enable the first five VPCs to resolve DNS requests in accordance with DNS resolution rules of any of the ten VPCs attached to the second transit gateway.

As shown in FIG. 1A, the virtual private clouds 101A-101D (VPCs A through D) represent private virtualized networks implemented by a substrate network, such as the substrate network that will be described below with respect to FIGS. 1B and 2. Each VPC may include, for example, one or more servers (not illustrated), a DNS resolver (illustrated as DNS resolvers 102A-102D), as well as DNS data (illustrated as DNS data 103A-103D) and routing data (illustrated as 104A-104D). Servers associated with the individual VPCs may generally provide any network-accessible functionality, such as web page hosting or database hosting, among many others known in the art. The private DNS resolvers 102A-102D may each independently provide DNS functionality to the server(s) within a VPC. For example, DNS resolver 102A may provide DNS resolution functionality within VPC A, while DNS resolver 102B may provide DNS resolution functionality within VPC B. The functionality of each DNS resolver generally includes at least resolving DNS requests of private domain names or private network addresses associated with at least the given VPC (as well as private domains or private network addresses associated with other VPCs attached to the same transit gateway, which will be discussed further below). Systems and methods for implementing private DNS resolution functionality associated with VPCs are described in more detail in U.S. patent application Ser. No. 14/750,698, entitled "SELECTIVE ROUTING OF DOMAIN NAME SYSTEM (DNS) REQUESTS" and filed Jun. 25, 2015 (hereinafter, the "'698 application"), which is hereby incorporated by reference.

In addition to the private DNS functionality provided by the DNS resolvers 102A-102D (as further described in the '698 application), the DNS resolvers 102A-102D may each be configured to implement managed rules-based resolution of DNS requests, such as based on rules established by an owner of the given VPC. Systems and methods for providing such adaptive DNS resolution functionality utilizing a rules interface, rules data store, and an associated resolver engine, are described in more detail in U.S. Pat. No. 10,033,691, entitled "ADAPTIVE RESOLUTION OF DOMAIN NAME REQUESTS IN VIRTUAL PRIVATE CLOUD NETWORK ENVIRONMENTS," issued Jul. 24, 2018 (hereinafter, the "'691 patent"), which is hereby incorporated by reference.

As described in the '691 patent, a given DNS resolver (such as DNS resolver 102A) may in some embodiments be configured such that DNS requests originating from a computing device within a given VPC be processed or forwarded to different DNS servers based on rules established by an administrator or user of the VPC. Accordingly, an administrator of a VPC may specify that requests for a first domain name should be routed to a private DNS server within the VPC, that requests for a second domain name should be routed to a private DNS server in a distinct data center, and that requests for a third domain name should be handled via a public DNS system (e.g., via the normal functionality provided to the VPC by a hosting system). In some instances, as described in the '691 patent, an administrator of a VPC may further specify resolution rules for a domain name directly (e.g., a domain should be resolved to a specific internet protocol [IP] address), or may specify that a domain name should be "blackholed" (e.g., resolution requests for that domain should not be processed, which may at least partially prevent devices within the VPC from accessing the domain name).

The DNS resolver 102A and the server(s) of VPC A (as well as their counterparts at VPCs 101B-101D) may be implemented, for example, as virtual machines hosted by physical computing devices of a substrate network. The VPCs may include additional or alternative components than those shown in FIG. 1A, or may exclude a component shown in FIG. 1A. For example, while shown as included within VPC 101A, a DNS resolver 102A responsible for DNS resolution for requests originating from VPC 101A may in some instances be logically separate from the VPC 101A. For example, one or more distinct VPCs may be created that are associated with a set of DNS resolvers, each of which is associated with and provides DNS services to one or more customer VPCs. For example, because the VPCs are virtual network environments that may all be managed as part of the same underlying substrate network, the actual location or physical system from which a given VPC's resolver functionality is provided may be left to the operator of a VPC service and may change without effect on the VPC's operation. Thus, the arrangement of elements within the VPCs of FIG. 1A is intended to be illustrative and not limiting.

The DNS data 103A and routing data 104A of VPC 101A (as well as their counterparts within the other VPCs 101B-101D) may be stored in one or more data stores, which can correspond to any persistent or substantially persistent data storage, such as a hard drive (HDD), a solid state drive (SDD), network attached storage (NAS), a tape drive, or any combination thereof. Such a data store may be implemented directly by a physical storage device, or may be implemented by a virtualized storage device that is in turn implemented on an underlying physical storage device. Thus, for example, DNS data 103A and DNS data 103B may be stored on the same underlying physical storage device despite being accessed by their respective VPCs as virtually distinct data stores.

The stored DNS data at a given VPC (such as DNS data 103A at VPC 101A) may generally include, for example, records indicating domain names or hostnames, along with a corresponding network address for a given name. The stored DNS data may include a DNS table and/or DNS tree associated with the DNS records. The stored DNS data at a given VPC may further include, in some embodiments, various DNS resolution rules established at the given VPC, such as those of the types described in the '691 patent. The stored routing data at a given VPC (such as routing data 104A at VPC 101A) may generally include, for example, one or more route tables specifying rules used to determine where to direct network traffic. Subnets within a given VPC may each have an associated route table. A route table may include a number of entries that each indicate, for example, a destination CIDR and a target. For example, traffic originating from a given VPC and destined for an external network 172.16.0.0/12 could be targeted for a specific virtual private gateway. Methods for propagating routing data and DNS data among VPCs attached to a transit gateway will be further discussed below with respect to FIG. 3.

Overlay Network Manager

Figure 1B:
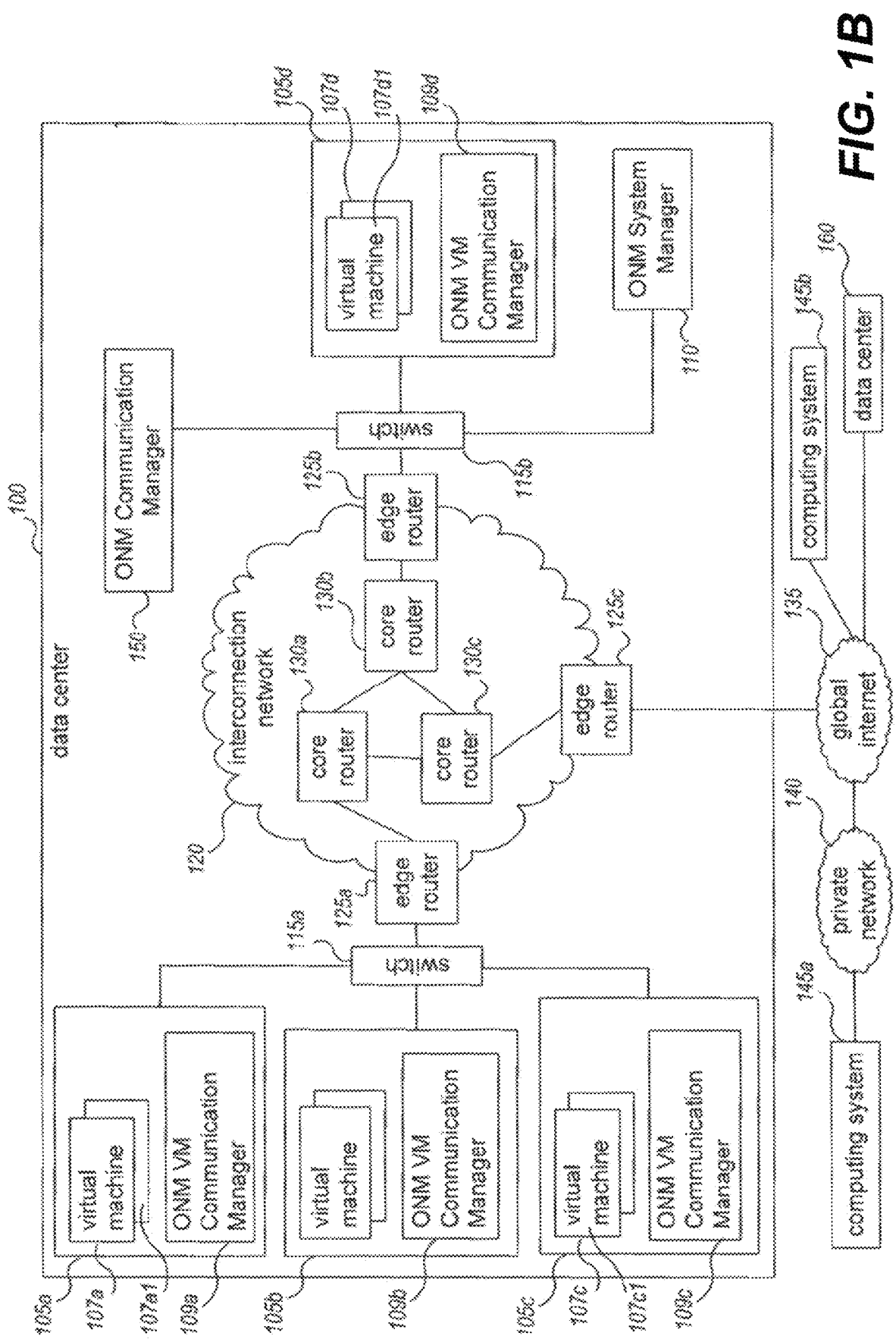
FIG. 1B is a block diagram illustrating an embodiment of a substrate network having computing nodes associated with a virtual computer network.
Figure 2:
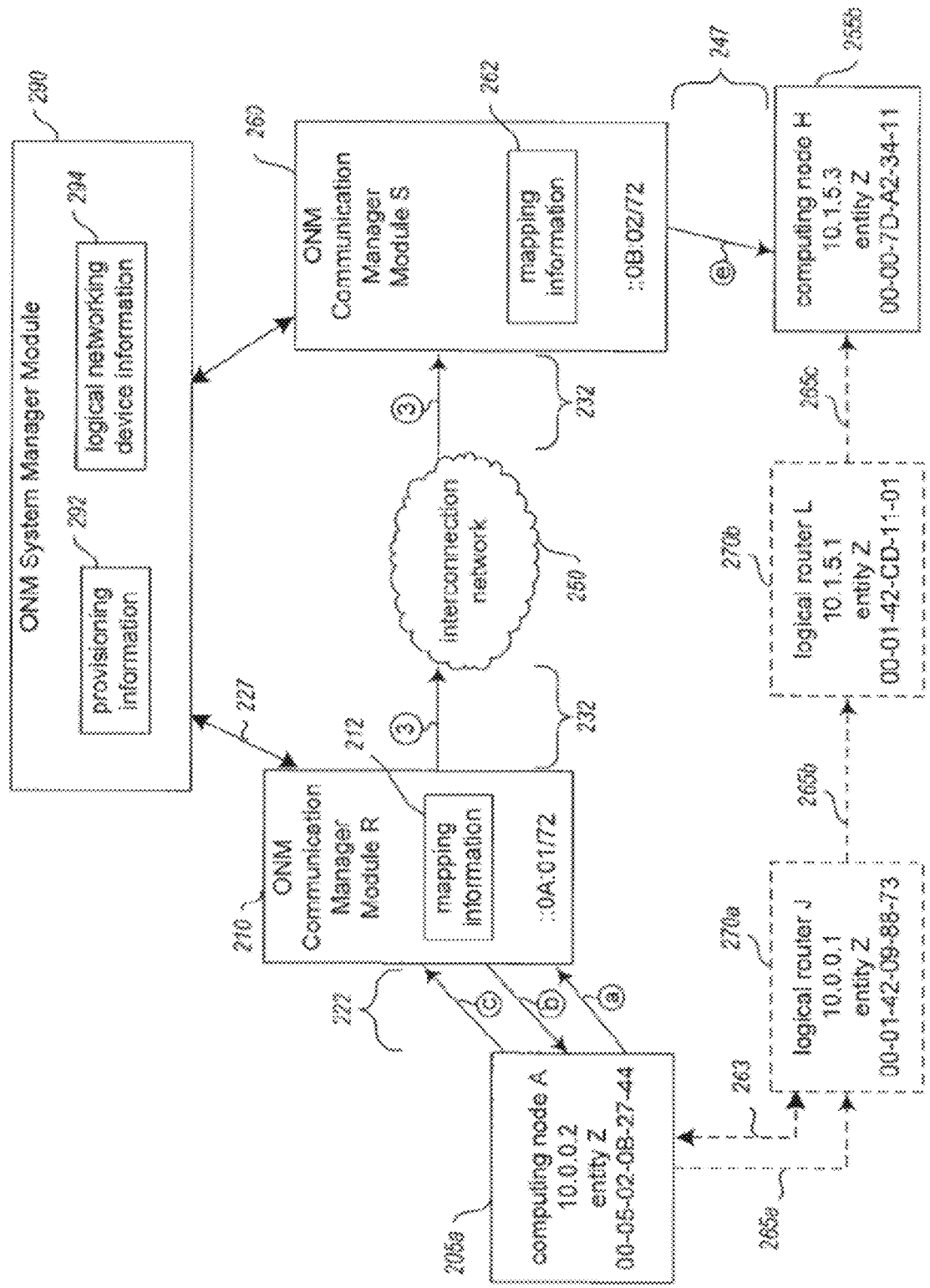
FIG. 2 is a block diagram of the substrate network of FIG. 1B illustrating logical networking functionality.

By way of overview, FIGS. 1B and 2 discuss embodiments where communications between multiple computing nodes of a virtual computer network emulate functionality that would be provided by logical networking devices if they were physically present. In some embodiments, some or all of the emulation is performed by an overlay network manager system. One skilled in the relevant art will appreciate, however, that the disclosed virtual computer network is illustrative in nature and should not be construed as limiting. Accordingly, the arrangement of virtualized components (including the VPCs 101A-101D) described with respect to FIG. 1A above may be implemented in different underlying network environments than those illustrated with respect to FIGS. 1B and 2.

FIG. 1B is a network diagram illustrating an embodiment of an overlay network manager system (ONM) for managing computing nodes associated with a virtual computer network. Virtual network communications can be overlaid on one or more intermediate physical networks in a manner transparent to the computing nodes. In this example, the ONM system includes a system manager module 110 and multiple communication manager modules 109a, 109b, 109c, 109d, 150 to facilitate the configuring and managing communications on the virtual computer network.

The illustrated example includes an example data center 100 with multiple physical computing systems operated on behalf of the ONM system. The example data center 100 is connected to a global internet 135 external to the data center 100. The global internet can provide access to one or more computing systems 145a via private network 140, to one or more other globally accessible data centers 160 that each have multiple computing systems, and to one or more other computing systems 145b. The global internet 135 can be a publicly accessible network of networks, such as the Internet, and the private network 140 can be an organization's network that is wholly or partially inaccessible from computing systems external to the private network 140. Computing systems 145b can be home computing systems or mobile computing devices that each connects directly to the global internet 135 (e.g., via a telephone line, cable modem, a Digital Subscriber Line ("DSL"), cellular network or other wireless connection, etc.).

The example data center 100 includes a number of physical computing systems 105a-105d and a Communication Manager module 150 that executes on one or more other computing systems. The example data center further includes a System Manager module 110 that executes on one or more computing systems. In this example, each physical computing system 105a-105d hosts multiple virtual machine computing nodes and includes an associated virtual machine ("VM") communication manager module (e.g., as part of a virtual machine hypervisor monitor for the physical computing system). Such VM communications manager modules and VM computing nodes include VM Communication Manager module 109a and virtual machines 107a on host computing system 105a, and VM Communication Manager module 109d and virtual machines 107d on host computing system 105d.

This illustrative data center 100 further includes multiple physical networking devices, such as switches 115a-115b, edge router devices 125a-125c, and core router devices 130a-130c. Switch 115a is part of a physical sub-network that includes physical computing systems 105a-105c, and is connected to edge router 125a. Switch 115b is part of a distinct physical sub-network that includes the System Manager module 110, and is connected to edge router 125b. The physical sub-networks established by switches 115a-115b, in turn, are connected to each other and other networks (e.g., the global internet 135) via an intermediate communication network 120, which includes the edge routers 125a-125c and the core routers 130a-130c. The edge routers 125a-125c provide gateways between two or more sub-networks or networks. For example, edge router 125a provides a gateway between the physical sub-network established by switch 115a and the interconnection network 120, while edge router 125c provides a gateway between the interconnection network 120 and global internet 135. The core routers 130a-130c manage communications within the interconnection network 120, such as by routing or otherwise forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on the physical network topology, etc.).

The System Manager module 110 and Communication Manager module 109 can configure, authorize, and otherwise manage communications between associated computing nodes, including providing logical networking functionality for one or more virtual computer networks that are provided using the computing nodes. For example, Communication Manager module 109a and 109c manages associated virtual machine computing nodes 107a and 107c and each of the other Communication Manager modules can similarly manage communications for a group of one or more other associated computing nodes. The Communication Manager modules can configure communications between computing nodes so as to overlay a virtual network over one or more intermediate physical networks that are used as a substrate network, such as over the interconnection network 120.

Furthermore, a particular virtual network can optionally be extended beyond the data center 100, such as to one or more other data centers 160 which can be at geographical locations distinct from the first data center 100. Such data centers or other geographical locations of computing nodes can be inter-connected in various manners, including via one or more public networks, via a private connection such as a direct or VPN connection, or the like. In addition, such data centers can each include one or more other Communication Manager modules that manage communications for computing systems at that data. In some embodiments, a central Communication Manager module can coordinate and manage communications among multiple data centers.

Thus, as one illustrative example, one of the virtual machine computing nodes 107a1 on computing system 105a can be part of the same virtual local computer network or virtual private cloud as one of the virtual machine computing nodes 107d1 on computing system 105d. The virtual machine 107a1 can then direct an outgoing communication to the destination virtual machine computing node 107d1, such as by specifying a virtual network address for that destination virtual machine computing node. The Communication Manager module 109a receives the outgoing communication, and in at least some embodiments determines whether to authorize the sending of the outgoing communication. By filtering unauthorized communications to computing nodes, network isolation and security of entities' virtual computer networks can be enhanced. Accordingly, the virtual machine computing nodes of a particular VPC may all be provided by or hosted on the same physical computing system as each other (such as a given VPC including virtual machines 107a and 107a1 of the computing system 105a), or could instead include virtual machine computing nodes that are split between multiple physical computing system, as discussed above.

The Communication Manager module 109a can determine the actual physical network location corresponding to the destination virtual network address for the communication. For example, the Communication Manager module 109a can determine the actual destination network address by dynamically interacting with the System Manager module 110, or can have previously determined and stored that information. The Communication Manager module 109a then re-headers or otherwise modifies the outgoing communication so that it is directed to Communication Manager module 109d using an actual substrate network address.

When Communication Manager module 109d receives the communication via the interconnection network 120, it obtains the virtual destination network address for the communication (e.g., by extracting the virtual destination network address from the communication), and determines to which virtual machine computing nodes 107d the communication is directed. The Communication Manager module 109d then re-headers or otherwise modifies the incoming communication so that it is directed to the destination virtual machine computing node 107d1 using an appropriate virtual network address for the virtual computer network, such as by using the sending virtual machine computing node 107a1's virtual network address as the source network address and by using the destination virtual machine computing node 107d1's virtual network address as the destination network address. The Communication Manager module 109d then forwards the modified communication to the destination virtual machine computing node 107d1. In at least some embodiments, before forwarding the incoming communication to the destination virtual machine, the Communication Manager module 109d can also perform additional steps related to security.

Further, the Communication Manager modules 109a and/or 109c on the host computing systems 105a and 105c can perform additional actions that correspond to one or more logical specified router devices lying between computing nodes 107a1 and 107c1 in the virtual network topology. For example, the source computing node 107a1 can direct a packet to a logical router local to computing node 107a1 (e.g., by including a virtual hardware address for the logical router in the packet header), with that first logical router being expected to forward the packet to the destination node 107c1 via the specified logical network topology. The source Communication Manager module 109a receives or intercepts the packet for the logical first router device and can emulate functionality of some or all of the logical router devices in the network topology, such as by modifying a TTL ("time to live") hop value for the communication, modifying a virtual destination hardware address, and/or otherwise modify the communication header. Alternatively, some or all the emulation functionality can be performed by the destination Communication Manager module 109c after it receives the packet.

By providing logical networking functionality, the ONM system provides various benefits. For example, because the various Communication Manager modules manage the overlay virtual network and can emulate the functionality of logical networking devices, in certain embodiments specified networking devices do not need to be physically implemented to provide virtual computer networks, allowing greater flexibility in the design of virtual user networks. Additionally, corresponding modifications to the interconnection network 120 or switches 115a-115b are generally not needed to support particular configured network topologies. Nonetheless, a particular network topology for the virtual computer network can be transparently provided to the computing nodes and software programs of a virtual computer network.

Logical/Virtual Networking

FIG. 2 illustrates a more detailed implementation of the ONM system of FIG. 1B supporting logical networking functionality. The ONM system includes more detailed embodiments of the ONM System Manager and ONM Communication Manager of FIG. 1B. In FIG. 2, computing node A is sending a communication to computing node H, and the actions of the physically implemented modules 210 and 260 and devices of network 250 in actually sending the communication are shown, as well as emulated actions of the logical router devices 270a and 270b in logically sending the communication.

In this example, computing nodes A 205a and H 255b are part of a single virtual computer network for entity Z. However, computing nodes can be configured to be part of two distinct sub-networks of the virtual computer network and the logical router devices 270a and 270b separate the computing nodes A and H in the virtual network topology. For example, logical router device J 270a can be a local router device to computing node A and logical router device L 270b can be a local router device to computing node H.

In FIG. 2, computing nodes A 205a and H 255b includes hardware addresses associated with those computing nodes for the virtual computer network, such as virtual hardware addresses that are assigned to the computing nodes by the System Manager module 290 and/or the Communication Manager modules R 210 and S 260. In this example, computing node A has been assigned hardware address "00-05-02-0B-27-44," and computing node H has been assigned hardware address "00-00-7D-A2-34-11." In addition, the logical router devices J and L have also each been assigned hardware addresses, which in this example are "00-01-42-09-88-73" and "00-01-42-CD-11-01," respectively, as well as virtual network addresses, which in this example are "10.0.0.1" and "10.1.5.1," respectively. The System Manager module 290 maintains provisioning information 292 that identifies where each computing node is actually located and to which entity and/or virtual computer network the computing node belongs.

This example, computing node A 205a first sends an address resolution protocol (ARP) message request 222-a for virtual hardware address information, where the message is expected to first pass through a logical device J before being forwarded to computing node H. Accordingly, the ARP message request 222-a includes the virtual network address for logical router J (e.g., "10.0.0.1") and requests the corresponding hardware address for logical router J.

Communication Manager module R intercepts the ARP request 222-a, and obtains a hardware address to provide to computing node A as part of spoofed ARP response message 222-b. The Communication Manager module R can determine the hardware address by, for example, looking up various hardware address information in stored mapping information 212, which can cache information about previously received communications. Communication Manager module R can communicate 227 with the System Manager module 290 to translate the virtual network address for logical router J.

The System Manager module 290 can maintain information 294 related to the topology and/or components of virtual computer networks and provide that information to Communication Manager modules. The Communication Manager module R can then store the received information as part of mapping information 212 for future use. Communication Manager module R then provides computing node A with the hardware address corresponding to logical router J as part of response message 222-*b*. While request 222-*a* and response message 222-*b* actually physically pass between computing node A and Communication Manager module R, from the standpoint of computing node A, its interactions occur with local router device J.

After receiving the response message 222-*b*, computing node A 205*a* creates and initiates the sending of a communication 222-*c* to computing node H 255*b*. From the standpoint of computing node A, the sent communication will be handled as if logical router J 270*a* were physically implemented. For example, logical router J could modify the header of the communication 265*a* and forward the modified communication 265*b* to logical router L 270*a*, which would similarly modify the header of the communication 265*b* and forward the modified communication 265*c* to computing node H. However, communication 222-*c* is actually intercepted and handled by Communication Manager module R, which modifies the communication as appropriate, and forwards the modified communication over the interconnection network 250 to computing node H by communication 232-3. Communication Manager module R and/or Communication Manager module S may take further actions in this example to modify the communication from computing node A to computing node H or vice versa to provide logical networking functionality. For example, Communication Manager module S can provides computing node H with the hardware address corresponding to logical router L as part of response message 247-*e* by looking up the hardware address in stored mapping information 262. In one embodiment, a communication manager or computing node encapsulates a packet with another header or label where the additional header specifies the route of the packet. Recipients of the packet can then read the additional header and direct the packet accordingly. A communication manager at the end of the route can remove the additional header.

A user or operator can specify various configuration information for a virtual computer network, such as various network topology information and routing costs associated with the virtual 270*a*, 270*b* and/or substrate network 250. In turn, the ONM System Manager 290 can select various computing nodes for the virtual computer network. In some embodiments, the selection of a computing node can be based at least in part on a geographical and/or network location of the computing node, such as an absolute location or a relative location to a resource (e.g., other computing nodes of the same virtual network, storage resources to be used by the computing node, etc.). In addition, factors used when selecting a computing node can include: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; or the like.

Further details regarding operation of a substrate network, such as the implementation of route selection on a substrate network and virtualized networks are discussed in more detail in U.S. Pat. No. 9,183,028, issued Nov. 10, 2015, entitled "MANAGING VIRTUAL COMPUTING NODES," (the "'028 Patent"), the entirety of which is incorporated by reference herein.

Transit Gateway Attachment and Subsequent DNS Resolution

Figure 3:
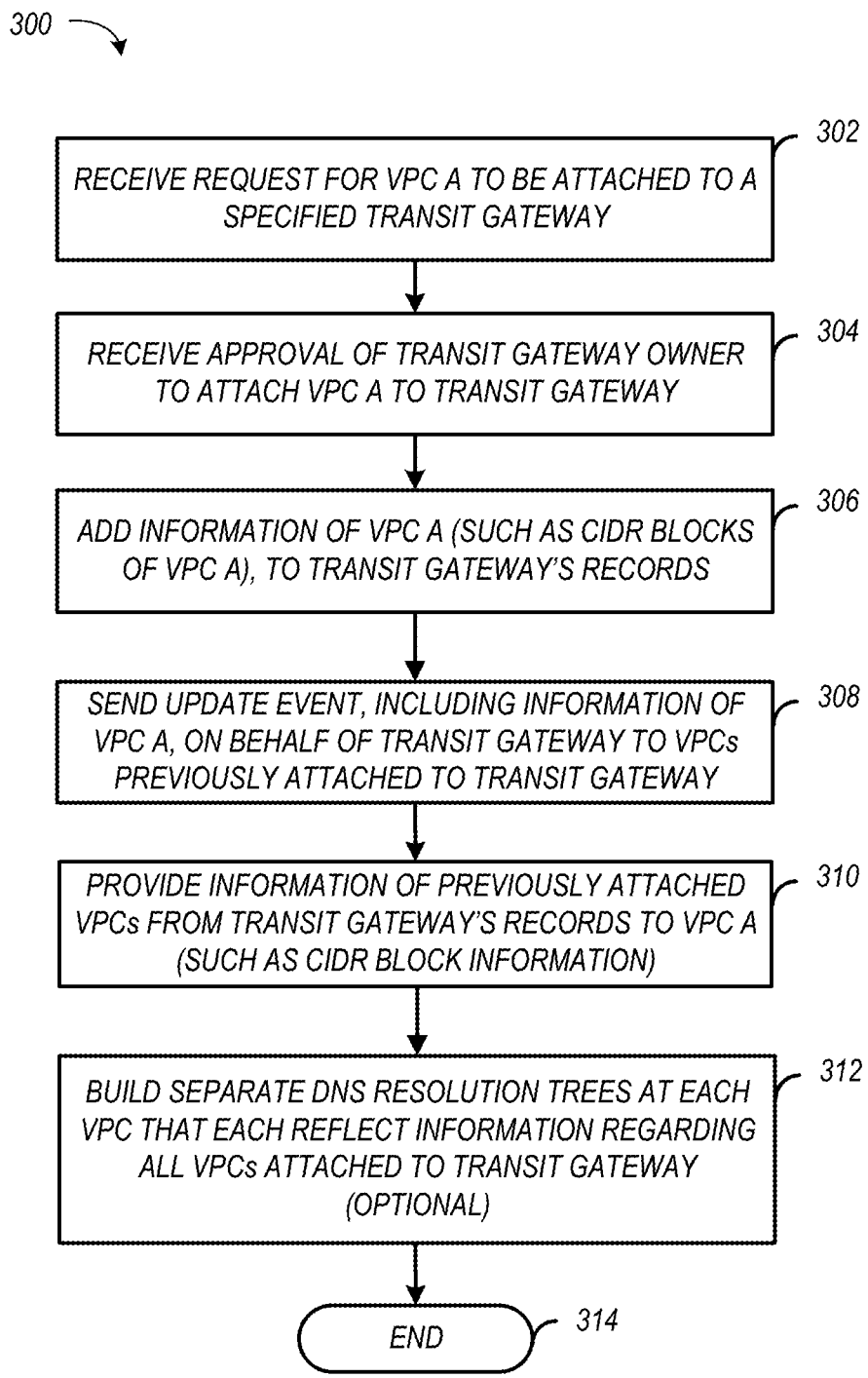
FIG. 3 is a flow diagram of an illustrative method for attaching a VPC to a transit gateway to which other VPCs have been previously attached.
Figure 4:
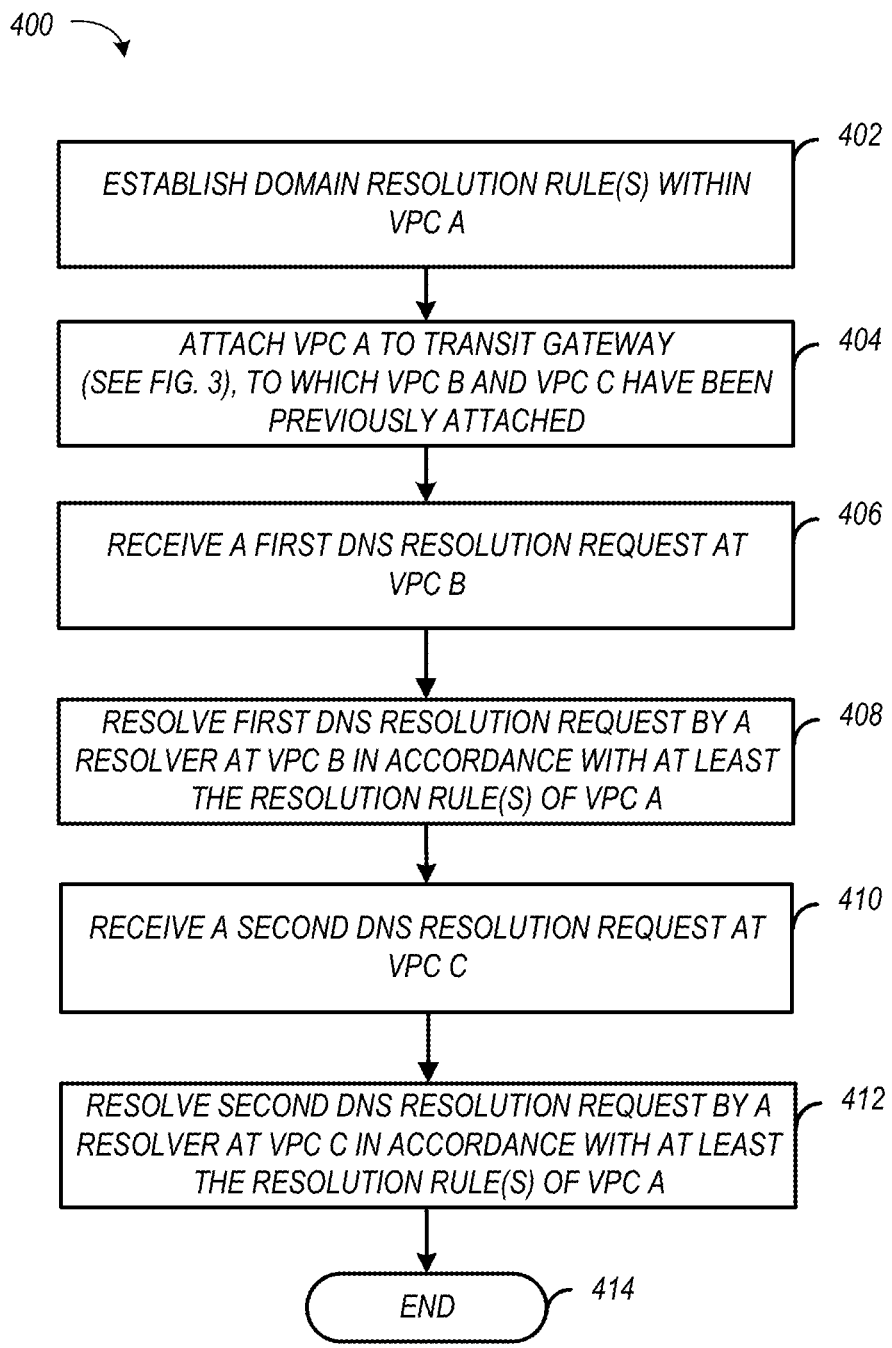
FIG. 4 is a flow diagram of an illustrative method that includes propagating DNS resolution rules from one VPC to other VPCs attached to the same transit gateway, and resolving DNS requests at individual VPCs.

With reference to FIGS. 3 and 4, aspects of the present disclosure will be described that enable VPCs to be arranged in a hub and spoke network topology via a transit gateway, as well as the subsequent DNS resolution functionality resulting from the VPCs' transit gateway attachments. FIG. 3 is described below with respect to a transit gateway that has already been established. Creation of such a transit gateway may include, for instance, establishing a transit gateway identifier (such as "tgw-017ehd83") and adjusting settings such as whether to enable DNS support, whether to propagate route tables, and/or other options. For purposes of this description, it will be assumed that the owner of the transit gateway and the VPC owners have opted to have DNS support enabled and route table propagation for all VPCs attached to a given transit gateway.

FIG. 3 is a flow diagram of an illustrative method 300 for attaching a VPC to a transit gateway to which other VPCs have been previously attached. The illustrative method 300 may be implemented at least in part by a system operated by a provider of VPCs, such as server 700 described below. The method begins at block 302, where the system may receive a request for VPC A to be attached to a specified transit gateway. As described above, the request may be received via an API, a command line interface, a GUI or other interface that may be provided by a system operator to enable administrators of individual VPCs to create a transit gateway, attach specific VPCs to that created transit gateway, and perform other network administration functions. The information provided by a user via the interface may include, for example, an identifier of the transit gateway (e.g., a string such as "tgw-017ehd83"), the attachment type (such as whether attaching a VPC or VPN), and the VPC to add (which may include a VPC identifier or name, and one or more subnets of the VPC).

At block 304, the system receives approval of the transit gateway owner or administrator to attach VPC A to the transit gateway. In some embodiments, a given transit gateway owner may have previously whitelisted certain VPCs as approved to attach to the transit gateway. If VPC A has not been previously approved, the system may be configured to contact the owner or administrator of the transit gateway to seek approval of the request. If the transit gateway owner denies the request, the illustrative method may end (not illustrated). Assuming instead that approval is obtained, the method 300 proceeds to block 306.

At block 306, the system may add information of VPC A to the transit gateway's records to indicate that VPC A has been attached to the transit gateway. The information may include an identifier of the VPC (e.g., "VPC-020c567"), as well as network address information, such as one or more CIDR blocks assigned to the VPC (e.g., "10.1.0.0/16"). In some embodiments, the transit gateway may additionally receive domain resolution rules (such as private domains associated with the VPC). In other embodiments, the CIDR information may be used in the future to retrieve corresponding DNS data from DNS records of the VPC, such that domain names need not be copied or propagated to the transit gateway records at the time of attachment. For example, at block 306 according to some embodiments, information identifying where CIDR block information is stored for VPC A (such as a route table identifier or address) may be stored in the transit gateway's records rather than copying CIDR block information to a new physical storage location. For example, a route table for VPC A may in fact be stored on the same physical storage device(s) as the transit gateway data and/or route table data of other VPCs attached to the transit gateway, given the virtualized nature of the network environment, such that the various routing table and/or DNS data could all be considered local to each of the VPCs within the underlying substrate network.

At block 308, the system may send an update event on behalf of the transit gateway to all VPCs previously attached to the transit gateway. In some instances, this could include hundreds or thousands of VPCs. The update event may indicate to those VPCs that VPC A has joined, and may provide similar information regarding VPC A as that which the transit gateway stored above (e.g., CIDR block information and optionally domain data). At block 310 (which could occur before or after block 308, depending on the embodiment), the system may provide information of the previously attached VPCs from the transit gateway's records to VPC A. This information may include CIDR block information for each of the other VPCs and optionally domain data for those other VPCs, as described above. VPC A may additionally be provided with information regarding the transit gateway itself, including routing data. As described above with respect to block 306, propagating the CIDR block information and/or DNS data between different VPCs via the transit gateway at time of attaching a VPC to the transit gateway may not necessarily involve sending or copying the CIDR block information itself, but rather may provide access to such data at a previously stored location (e.g., providing access to a routing table maintained for the transit gateway indicating the CIDR blocks assigned to each of the attached VPCs).

At block 312, individual VPCs may optionally generate DNS resolution trees at the individual VPCs that each reflect information regarding all VPCs attached to the transit gateway. The DNS trees, tables or other structure generated at each VPC may be similar with respect to the domain names and CIDR blocks of the VPCs attached to the given transit gateway, but may differ in other manners. For example, a given VPC may be attached to multiple transit gateways that each include different VPCs, may be peered with VPCs that are not part of the given transit gateway, and/or may have other network associations that cause its routing and DNS data to include additional information than some other VPCs attached to one of the same transit gateways. The illustrative method 300 ends at block 314.

FIG. 4 is a flow diagram of an illustrative method 400 that includes propagating DNS resolution rules from one VPC to other VPCs attached to the same transit gateway, and resolving DNS requests at individual VPCs. The illustrative method 400 may be implemented at least in part by a server or system associated with operation of the substrate network in which the VPCs are implemented.

At block 402, one or more domain resolution rules may be established within VPC A. As discussed above, the domain resolution rules may be of various types, such as rules indicating that a first domain name should be resolved to a specified private IP address by a resolver within the VPC, while a second domain name should be routed to a public IP address (such as by forwarding the associated DNS request to a public DNS server). Systems and methods for establishing DNS rules within a VPC, as well as providing the associated resolver functionality within the VPC, are described in the '698 application and the '691 patent incorporated by reference above.

At block 404, the system may attach VPC A to a transit gateway to which VPC B and VPC C have been previously attached. The process of attaching a VPC to a transit gateway is described above with reference to FIG. 3. As described above, the attachment process may include providing VPC A and each of the VPCs previously attached to the transit gateway with information that enables both routing between the VPCs and DNS resolution at each VPC in accordance with DNS resolution rules established at the various attached VPCs. While two VPCs (VPCs B and C) are specifically mentioned as examples, in some instances there may be hundreds of VPCs previously attached to the transit gateway.

At block 406, which may occur at any point after the process of attaching VPC A to the transit gateway is complete, a first DNS resolution request may be received at VPC B (one of the VPCs previously attached to the transit gateway that VPC A has now joined). The DNS resolution request may be received from a computing device within VPC B, and may be either a forward DNS lookup (e.g., querying to determine a network address for a domain name provided in the request) or a reverse DNS lookup (e.g., querying to determine a domain name for a network address provided in the request).

At block 408, a resolver within VPC B may resolve the first DNS resolution request in accordance with at least the one or more resolution rules previously established at VPC A, and may do so without forwarding the request to VPC A. This functionality is possible, as described above, based on the transit gateway's propagation of VPC A's information (including the CIDR blocks assigned to VPC A) to VPC B. To resolve the request in one embodiment, a DNS tree may have been previously generated at VPC B that takes into account the domain information of each of the other VPCs attached to the given transit gateway (as well as the domain information of any other VPCs that VPC B may be peered with outside of the transit gateway, in some instances), and may resolve the request based on that DNS tree. To resolve the request in another embodiment, the resolver at VPC B may first check a DNS tree or other DNS data that is specific to the domain rules and CIDR blocks of only VPC B, then may check DNS trees or other DNS data of one or more other VPCs that are attached to the same transit gateway until finding a match for the request (otherwise returning a non-existent domain indication if no match is ultimately found).

As a first example in one embodiment, a DNS request for "ec2-54-1-2-3.compute-1.example.com" may resolve to a private IP address if the interface behind the name is in a VPC associated with the VPC making the query (such as a VPC attached to the same transit gateway). Otherwise, this first example may resolve to a public IP address in this example instance. As a second example, a DNS request for "ip-10-1-2-3.ec2.internal" may resolve to the private IP address in the name (e.g., "10.1.2.3" in this instance) if the private IP address is within a CIDR range assigned to one of the VPCs associated with the VPC making the query (such as a VPC attached to the same transit gateway). Otherwise, this second example may be resolved as a non-existent domain name (e.g., NXDOMAIN) in this example instance. As a third example, a DNS request for "3.2.1.10.in-addr.arpa" (a reverse lookup) may resolve to "ip-10-1-2-3.ec2.internal" if the IP address is within one of the associated VPCs' CIDR ranges. Otherwise, this third example may similarly be resolved as a non-existent domain name (e.g., NXDOMAIN).

At block 410, a second DNS resolution request is received, but this time is received at VPC C rather than VPC B. The second DNS resolution request may originate from a computing device within VPC C. The second DNS resolution request may implicate a domain resolution rule previously established at VPC A (similar to the first DNS request at block 406), such as by relating to a private IP address that is within a CIDR block assigned to VPC A. At block 412, a resolver within VPC C may resolve the second DNS resolution request in accordance with at least the one or more applicable resolution rules previously established at VPC A in a similar manner as described above with respect to VPC B's resolution of the first DNS request. Thus, a resolver at VPC B or a resolver at VPC C (as well as resolvers other VPCs attached to the same gateway) may each independently resolve a DNS request received at the given VPC in accordance with the DNS rules and private domains established at VPC A. Similarly, VPC A may independently resolve a DNS request received at VPC A in accordance with the DNS rules and private domains established at VPCs B and C. The illustrative method 400 ends at block 414.

Example Server Architecture

Figure 5:
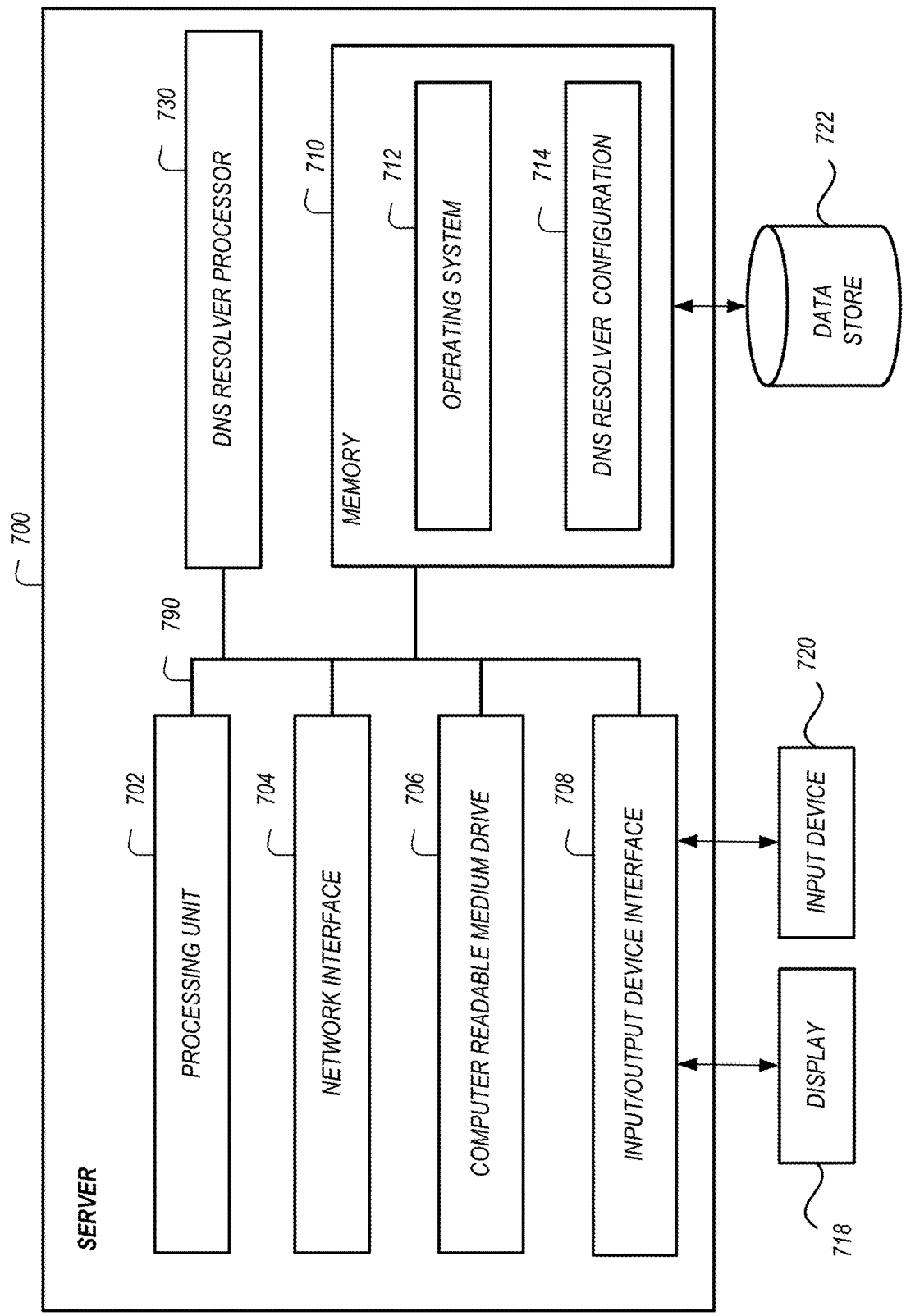
FIG. 5 is a block diagram depicting an illustrative architecture for a server that may implement one or more of the features described.

FIG. 5 is a block diagram depicting an illustrative architecture for a server that may implement one or more of the features described. The server 700 can be a virtual environment hosting server, and may include a processing unit 702, a network interface 704, a computer readable medium drive 706, an input/output device interface 708, and a memory 710. The network interface 704 can provide connectivity to one or more networks or computing systems. The processing unit 702 can receive information and instructions from other computing systems or services via the network interface 704. The network interface 704 can also store data directly to memory 710. The processing unit 702 can communicate to and from memory 710 and output information to an optional display 718 via the input/output device interface 708. The input/output device interface 708 can also accept input from the optional input device 720, such as a keyboard, mouse, digital pen, microphone, mass storage device, etc.

The server 700 can further include a DNS resolver processor 730 for implementing aspects of the present disclosure, such as the DNS resolver functionality described above. In some implementations, the DNS resolver processor 730 may be commonly implemented with or as the processing unit 702. The memory 710 contains computer program instructions that the processing unit 702 executes in order to implement one or more embodiments discussed herein. The memory 710 generally includes RAM, ROM, and/or other persistent, non-transitory computer readable media. The memory 710 can store an operating system 712 that provides computer program instructions for use by the processing unit 702 or other elements included in the computing device in the general administration and operation of the server 700.

The memory 710 may include a DNS resolver configuration 714. The DNS resolver configuration 714 may include various domain resolution rules as described above. The memory 710 may also include or communicate with one or more auxiliary data stores, such as data store 722. The data store 722 may electronically store data regarding the DNS service instances, the VPC, authorized user information, and the like. The elements included in the server 700 may be coupled by a bus 790. The bus 790 may be a data bus, communication bus, or other bus mechanism to enable the various components of the server 700 to exchange information.

In some embodiments, the server 700 may include additional or fewer components than are shown in FIG. 5. For example, a server 700 may include more than one processing unit 702 and computer readable medium drive 706. In another example, the computing device 702 may not be coupled to a display 718 or an input device 720. In some embodiments, two or more servers may together form a computer system for executing features of the present disclosure. The server may additionally include a number of other components, modules and/or processors not illustrated in FIG. 5 that are dedicated to particular functionality described herein, such as enabling setup and management of a transit gateway, which may include providing one or more APIs or other interfaces described above.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for resolution of domain name system (DNS) requests within a virtual network environment that includes a plurality of virtual private clouds, wherein each virtual private cloud (VPC) of the plurality of virtual private clouds includes one or more virtual computing devices arranged within a virtualized local area network, the virtualized local area network generated by a substrate network hosting the VPC, the system comprising:
   a non-transitory data store including transit gateway data identifying a subset of the plurality of virtual private clouds as attached to a virtual hub in a hub and spoke network arrangement, wherein the subset of the plurality of virtual private clouds includes a first VPC and a second VPC;
   at least one computing device configured with computer-executable instructions that, when executed, cause the at least one computing device to:
      store, within a third VPC, domain resolution rules for the third VPC, wherein the domain resolution rules include identification of at least one domain name that should be resolved to a private network address within the third VPC;
      receive a request for the third VPC to be attached to the virtual hub;
      obtain acceptance of the request from an administrator associated with the virtual hub;
      based on the acceptance of the request:
         update the transit gateway data to include data identifying the third VPC as attached to the virtual hub;
         send an update event to each of the subset of the plurality of virtual private clouds indicating that the third VPC is attached to the virtual hub, wherein the update event provides information identifying network addresses assigned to the third VPC;
         provide, to the third VPC based at least in part on the transit gateway data, network address information associated with each of the subset of the plurality of virtual private clouds attached to the virtual hub;
      subsequent to the update event, receive a DNS resolution request within the first VPC; and
      resolve the DNS resolution request by a DNS resolver within the first VPC in accordance with at least the domain resolution rules for the third VPC.

2. The system of claim 1, wherein the subset of the plurality of virtual private clouds attached to the virtual hub comprises hundreds of virtual private clouds.

3. The system of claim 1, wherein the information identifying network addresses assigned to the third VPC comprises one or more Classless Inter-Domain Routing (CIDR) address blocks.

4. The system of claim 1, wherein the computer-executable instructions further cause the at least one computing device to generate a first DNS resolution tree at the first VPC and a second DNS resolution tree at the second VPC, wherein the first DNS resolution tree and the second DNS resolution tree each reflects domain resolution rules established at each of a plurality of VPCs attached to the virtual hub.

5. A computer-implemented method for resolution of domain name system (DNS) requests within a virtual network environment that includes virtual private clouds, wherein each virtual private cloud (VPC) includes one or more virtual computing devices arranged within a virtualized network, the virtualized network generated by a substrate network hosting the VPC, the computer-implemented method comprising:
   storing, within a first VPC, domain resolution rules for the first VPC, wherein the domain resolution rules include identification of at least one domain name that should be resolved to a private network address within the first VPC;
   receiving a request for the first VPC to be attached to a virtual hub, wherein information associated with the virtual hub identifies a plurality of virtual private clouds attached to the virtual hub, wherein the plurality of virtual private clouds includes a second VPC and a third VPC;
   in response to the request for the first VPC to be attached to the virtual hub, updating the information associated with the virtual hub to identify the first VPC as attached to the virtual hub;
   sending an update event to each of the plurality of virtual private clouds indicating that the first VPC is attached to the virtual hub, wherein the update event provides information identifying network addresses assigned to the first VPC;
   providing, to the first VPC based at least in part on the information associated with the virtual hub, network address information associated with each of the plurality of virtual private clouds attached to the virtual hub;
   subsequent to the update event, receiving a DNS resolution request within the second VPC; and
   resolving the DNS resolution request by a DNS resolver within the second VPC in accordance with at least the domain resolution rules for the first VPC.

6. The computer-implemented method of claim 5 further comprising resolving a second DNS resolution request by a second DNS resolver within the third VPC in accordance with at least the domain resolution rules for the first VPC.

7. The computer-implemented method of claim 5, wherein the information identifying network addresses assigned to the first VPC comprises one or more Classless Inter-Domain Routing (CIDR) address blocks.

8. The computer-implemented method of claim 5, wherein the DNS resolver within the second VPC is configured to resolve names associated with network addresses that are within network address ranges assigned to any of the plurality of virtual private clouds attached to the virtual hub.

9. The computer-implemented method of claim 5, further comprising generating a first DNS resolution tree at the first VPC and a second DNS resolution tree at the second VPC, wherein the first DNS resolution tree and the second DNS resolution tree each reflects domain resolution rules established at each of at least a first plurality of VPCs attached to the virtual hub.

10. The computer-implemented method of claim 9, wherein resolving the DNS resolution request by the DNS resolver within the second VPC comprises finding a match within the second DNS resolution tree for data included in the DNS resolution request.

11. The computer-implemented method of claim 5, wherein resolving the DNS resolution request by the DNS resolver within the second VPC comprises:
    performing a search, within DNS data that is specific to the second VPC, for data matching a network address or domain name in the DNS resolution request;
    based at least in part on a determination that the search did not find a match, performing a second search by the DNS resolver within the second VPC of DNS data associated with the first VPC; and
    resolving the DNS resolution request based on a match found in the second search.

12. The computer-implemented method of claim 5, wherein the DNS resolution request includes a domain name, and wherein resolving the DNS resolution request comprises determining a network address corresponding to the domain name.

13. The computer-implemented method of claim 5, wherein the DNS resolution request includes a network address, and wherein resolving the DNS resolution request comprises determining a domain name corresponding to the network address.

14. Non-transitory computer readable media including computer-executable instructions for resolution of domain name system (DNS) requests within a virtual network environment that includes virtual private clouds, wherein each virtual private cloud (VPC) includes one or more virtual computing devices arranged within a virtualized network, wherein the computer-executable instructions, when executed by a computing system, cause the computing system to perform operations comprising:
    storing, within a first VPC, domain resolution rules for the first VPC;
    receiving a request for the first VPC to be attached to a virtual hub, wherein information associated with the virtual hub identifies a plurality of virtual private clouds attached to the virtual hub, wherein the plurality of virtual private clouds includes a second VPC and a third VPC;
    updating the information associated with the virtual hub to identify the first VPC as attached to the virtual hub;
    providing, to each of the plurality of virtual private clouds attached to the virtual hub, information identifying network addresses assigned to the first VPC;
    providing, to the first VPC based at least in part on the information associated with the virtual hub, network address information associated with each of the plurality of virtual private clouds attached to the virtual hub;
    receiving a DNS resolution request within the second VPC; and
    resolving the DNS resolution request by a DNS resolver within the second VPC in accordance with at least the domain resolution rules for the first VPC without forwarding the DNS resolution request to a DNS resolver of the first VPC, wherein the resolving the DNS resolution request by the DNS resolver within the second VPC comprises:
        performing a search, within DNS data that is specific to the second VPC, for data matching a network address or domain name in the DNS resolution request;
        based at least in part on a determination that the search did not find a match, performing a second search by the DNS resolver within the second VPC of DNS data associated with the first VPC; and
        resolving the DNS resolution request based on a match found in the second search.

15. The non-transitory computer readable media of claim 14, wherein the operations further comprise resolving a second DNS resolution request by a second DNS resolver within the third VPC in accordance with at least the domain resolution rules for the first VPC.

16. The non-transitory computer readable media of claim 14, wherein the information identifying network addresses assigned to the first VPC comprises one or more Classless Inter-Domain Routing (CIDR) address blocks.

17. The non-transitory computer readable media of claim 14, wherein the DNS resolver within the second VPC is configured to resolve names associated with network addresses that are within network address ranges assigned to any of the plurality of virtual private clouds attached to the virtual hub.

18. The non-transitory computer readable media of claim 14, wherein the operations further comprise generating a first DNS resolution tree at the first VPC and a second DNS resolution tree at the second VPC, wherein the first DNS resolution tree and the second DNS resolution tree each reflects domain resolution rules established at each of at least a first plurality of VPCs attached to the virtual hub.

19. The non-transitory computer readable media of claim 18, wherein the resolving the DNS resolution request by the DNS resolver within the second VPC comprises finding a match within the second DNS resolution tree for data included in the DNS resolution request.

* * * * *